(12) United States Patent
Lee

(10) Patent No.: US 12,173,831 B2
(45) Date of Patent: Dec. 24, 2024

(54) PIPELINE INSPECTION SYSTEM WITH SCALE REMOVING FEATURE

(71) Applicant: Catholic Kwandong University Industry Foundation, Gangwon-do (KR)

(72) Inventor: Ung-Kyun Lee, Gangwon-do0 (KR)

(73) Assignee: Catholic Kwandong University Industry Foundation, Gangwon-do (KR)

( * ) Notice: Subject to any disclaimer, the term of this patent is extended or adjusted under 35 U.S.C. 154(b) by 239 days.

(21) Appl. No.: 17/679,594

(22) Filed: Feb. 24, 2022

(65) Prior Publication Data

US 2023/0003330 A1 Jan. 5, 2023

(51) Int. Cl.
| | |
|---|---|
| *F16L 55/40* | (2006.01) |
| *B08B 7/02* | (2006.01) |
| *B08B 9/051* | (2006.01) |
| *B08B 9/053* | (2006.01) |
| *B08B 9/055* | (2006.01) |
| *F16L 55/32* | (2006.01) |
| *F16L 55/48* | (2006.01) |

(Continued)

(52) U.S. Cl.
CPC .............. *F16L 55/40* (2013.01); *B08B 7/028* (2013.01); *B08B 9/051* (2013.01); *B08B 9/053* (2013.01); *B08B 9/0552* (2013.01); *F16L 55/32* (2013.01); *F16L 55/48* (2013.01); *F16L 58/00* (2013.01); *G01N 29/2481* (2013.01); *G01N 29/265* (2013.01); *B08B 2209/005* (2013.01);

(Continued)

(58) Field of Classification Search
CPC .......... B08B 2209/005; B08B 2209/04; B08B 7/028; B08B 9/0326; B08B 9/051; B08B 9/053; B08B 9/0552; F16L 2101/12; F16L 2101/30; F16L 55/32; F16L 55/40; F16L 55/48; F16L 58/00; G01N 2291/2636; G01N 29/2481; G01N 29/265

See application file for complete search history.

(56) References Cited

U.S. PATENT DOCUMENTS

| | | | | |
|---|---|---|---|---|
| 6,880,402 B1 * | 4/2005 | Couet | ................... | E21B 34/066 73/1.49 |
| 2010/0300485 A1 * | 12/2010 | Fjerdingstad | ........... | F16L 55/46 134/8 |

(Continued)

FOREIGN PATENT DOCUMENTS

| | | | | | |
|---|---|---|---|---|---|
| CN | 106623281 A | * | 5/2017 | ............. | B08B 9/027 |
| DE | 102004042984 A1 | * | 3/2006 | ............. | B08B 9/043 |

(Continued)

*Primary Examiner* — David L Singer
(74) *Attorney, Agent, or Firm* — Howson & Howson LLP

(57) ABSTRACT

In a pipeline inspection system, a hollow spherical ball has an internal ultrasonic vibration module, an internal battery for powering the vibration module, and an internal, wirelessly operated, control for controlling the vibration module while the ball is moving, with liquid, along the pipeline. Liquid, having a reduced oxygen content, is pumped through the pipeline, and filtered before returning to the pipeline. Each of a plurality of holes, connecting the interior to the exterior of the ball, is tapered proceeding in the direction from the interior to the exterior, resulting in the formation of a blade structure where the interior of each hole meets the outer surface of the ball at an inclined angle. When the blade structure is in contact with the wall of the pipe, and caused to vibrate by the vibration module, it is able to cut off scale from the interior of the pipe.

2 Claims, 17 Drawing Sheets

(51) Int. Cl.
*F16L 58/00* (2006.01)
*F16L 101/12* (2006.01)
*G01N 29/24* (2006.01)
*G01N 29/265* (2006.01)
*F16L 101/30* (2006.01)

(52) U.S. Cl.
CPC ....... *B08B 2209/04* (2013.01); *F16L 2101/12* (2013.01); *F16L 2101/30* (2013.01); *G01N 2291/2636* (2013.01)

(56) References Cited

U.S. PATENT DOCUMENTS

| | | | |
|---|---|---|---|
| 2012/0006420 A1* | 1/2012 | Cooper | B08B 9/0552 137/15.07 |
| 2014/0283876 A1* | 9/2014 | Fjerdingstad | B08B 9/0535 134/8 |
| 2018/0149301 A1* | 5/2018 | Aslam | B08B 9/055 |
| 2019/0086018 A1* | 3/2019 | Seibi | G01M 3/246 |
| 2019/0325668 A1* | 10/2019 | Cole | G05D 1/0692 |

FOREIGN PATENT DOCUMENTS

| | | | | |
|---|---|---|---|---|
| KR | 20030086556 A | * | 11/2003 | ............. B08B 7/028 |
| KR | 20-0389135 Y1 | | 6/2005 | |
| KR | 100761368 B1 | * | 9/2007 | ............. B08B 9/027 |
| KR | 101046216 B1 | * | 7/2011 | ............. G01M 3/005 |
| KR | 101470788 B1 | * | 12/2014 | ............. A47L 15/13 |
| KR | 20160069668 A | * | 6/2016 | ............. F16L 11/11 |
| KR | 10-2026930 B1 | | 9/2019 | |
| KR | 10-2057699 B1 | | 1/2020 | |
| KR | 10-2011-0048652 A | | 5/2021 | |
| WO | WO-2020067227 A1 | * | 4/2020 | ............. B08B 3/102 |

* cited by examiner

PIPELINE INSPECTION SYSTEM WITH SCALE REMOVING FEATURE

BACKGROUND OF THE INVENTION

1. Technical Field

The present disclosure relates to a pipeline inspection system, and more specifically, to a pipeline inspection system having a novel structure, able to scan a pipeline, gather image information in real time while moving along an old pipeline, transfer the image information and location information to a server via a communications module, store the image information and the location information as attributes of BIM drawings, and inspect a state of the pipeline through the information transferred to the server, and which can remove scale accumulated on the inner wall of the pipeline with ultrasonic vibrations so as to continuously maintain the pipeline and to take a proactive approach to maintenance.

2. Description of Related Art

In general, various kinds of pipes, including water supply conduits, are provided inside a building. Particularly, water containing a large amount of lime may flow in the water supply conduit. Because lime scale is generated in the pipeline when being used for a long time, there may be a reduction of the lifespan of the pipeline or a blockage of the pipeline. Moreover, such a pipeline requires continuous maintenance when aging together with the building. However, there has been no method for reviewing an aged pipeline when an owner of a building transfers ownership of the building. Therefore, a method for solving the problem is required.

Existing maintenance means a repair after a failure. That is, a method for taking action after a water leakage has been generated in a pipe is applied. This causes a physical loss due to water leakage and a temporal monetary penalty.

Meanwhile, since the pipe is buried in a floor or a wall surface of a building, in order to maintain the pipe, it is necessary to maintain the pipe using a thermal imaging camera, an endoscope, or an ultrasonic inspection device, but it is very difficult to maintain the pipe.

Thus, a method of removing scale in the pipe using a fast flow rate by increasing the water pressure in the pipe is applied in some fields, but it is difficult to expect a significant effect, and accidents in which old pipes are damaged are frequently generated.

Korean Patent Publication No. 10-2011-0048652 discloses a cleaning device for a pipe, for removing rust, scale, and slime formed inside a pipe of a building using ozone generated by an ozone generator, and for performing washing and sterilization at the same time, comprising: a pump connected to a raw water supply pipe to which raw water is supplied; a magnetized water generator mounted on the raw water supply pipe to magnetize the raw water supplied to the pump with magnetic force to generate magnetized water; a compressor for generating high-pressure compressed air; a supply pipe connected to the compressor and connected to one side of the pump to supply the compressed air to the pump; an injector mounted on the supply pipe to intake and supply the compressed air and ozone generated by the ozone generator to the pump together; a discharge pipe connecting the pump and the main pipe of the building to each other; and a mixer mounted on the discharge pipe so that the washing water generated by mixing the ozone and the magnetized water passing through the pump is supplied to the main pipe of the building.

Furthermore, Korean Patent No. 10-2026930 discloses a technology of removing scale, slime, and foreign matter in a water supply pipe using water and pneumatic pressure, the technology comprising: a main body including a housing, which has an empty space formed therein by an open upper surface, a water inlet and a water outlet disposed at the lower area of both side surfaces of the outer face, and an air inlet formed in an upper area of one side surface thereof, a dashboard which is detachably mounted on the upper portion of the housing to allow a user to control the device and to display a used state, and a cover hinge-coupled to an upper end of the rear surface of the housing to cover the dashboard; a pipe washing device including a washing unit, which is mounted inside the housing of the main body, and which has a water injection pipe communicating with the water inlet, a first valve, a water flow pipe, a second valve, and a water discharge pipe which are connected in order, wherein the water discharge pipe is connected to the water outlet and a water supply pump is disposed to supply water to the water injection pipe, and an air supply pipe communicating with the air inlet, an air supply pump, and an air discharge pipe, wherein the air discharge pipe is connected to one side of the water discharge pipe; and a fixing module which is installed in a water pipe to be washed.

Additionally, Korean Utility Model Registration No. 20-0389135 discloses a pipe cleaning device comprising: an injector mounted on a connection part of a supply pipe of a pump connected to a water tank and an ozone input pipe to simultaneously introduce water supplied through the pump and ozone generated by an ozone generator; a mixer connected to an injection port of the injector to uniformly mix the water and the ozone passing through the injector; and a bubble generating unit mounted between the mixer and a pipe of a building to generate a large amount of bubbles.

The conventional art teaches extending the service life of pipes by washing the inside of the pipes without replacing old pipes. However, the conventional art exhibits insufficient effect in removing scale accumulated for a long period of time even in the case that high-pressure water, compressed air, and ozone are injected into the pipe, and have a limitation in extension of service life through washing since a cleaning robot cannot dispense washing solution to a heating pipe, a small pipe having a curvature. In addition, the conventional art does not teach checking an exact location in which scale is accumulated. Therefore, there is a need to make a new method for solving this problem.

Prior art documents include the Korean patents and utility model registration mentioned above.

SUMMARY OF THE INVENTION

The present disclosure has been made to solve the above-mentioned problems occurring in the prior art, and an object thereof is to provide a pipeline inspection system for effectively managing a pipeline by inspecting a state of the pipeline while moving together with fluid or gas along the pipeline.

It is another object to provide a pipeline inspection system, which can improve scale removal efficiency by removing scale accumulated on the inner wall of the pipeline with ultrasonic vibrations and prevent water leakage due to corrosion of the inner wall of the pipeline.

To accomplish the above objects, in an aspect of the present disclosure, there is provided a pipeline inspection system including: a smart ball formed with a spherical shape to move along the inside of a pipe, and having a plurality of through-holes penetrating the outer circumferential surface and a space portion formed inside the smart ball to communicate with the through-holes; and an ultrasonic vibration module mounted in the space portion of the smart ball, driven by electric power of a battery, and provided to be controlled wirelessly by a control unit, wherein when ultrasonic vibrations are generated by the ultrasonic vibration module while the smart ball is moved along the pipe, the ultrasonic vibrations are emitted by fluid inside the pipe as a carrier, so that the scale is removed by a cavitation phenomenon.

According to another embodiment of the present disclosure, the fluid inside the pipe is a fluid with low dissolved oxygen saturation from which oxygen is removed.

According to another embodiment of the present disclosure, the fluid inside the pipe is circulated through a filtering process by the filtering module. The filtering module includes: a pump connected to the inlet and the outlet of the pipe to circulate the internal fluid; and a filter mounted on the outlet of the pipe to filter foreign matter containing scale, and the fluid filtered by the filter is circulated and supplied through the inlet of the pipe by the pump and is provided to be circulated and transferred through the through-holes and the space portion of the smart ball.

According to another embodiment of the present disclosure, sensors are provided in positions corresponding to the inlet and the outlet of the pipe to detect whether the smart ball reaches the inlet or the outlet of the pipe, and is set to a control unit to automatically switch the fluid movement direction of the pump in the opposite direction.

According to another embodiment of the present disclosure, the through-holes of the smart ball are inclined holes having a diameter extending inwardly from the exterior, and the outer circumferential surface of the smart ball comes in contact with the outer end of the through-hole at an inclined angle so that a vibration blade of a saw blade structure is formed at a boundary part, and when scale is received into the through-hole while the smart ball is moved in a state of being grounded on the inner circumferential surface of the pipe, the vibration blade is vibrated to cut off the scale.

According to another embodiment of the present disclosure, a rotational core module is provided in the space of the smart ball. The rotational core module includes: a rotary shaft of which both ends are rotatably mounted on the inner circumferential surface of the space portion; a flywheel mounted on the rotary shaft; a rotor in which permanent magnets of which the north pole and the south pole are alternately and repeatedly arranged around the rotary shaft; and a stator fixed in the space portion to correspond to the rotor and controlling the magnetic force by an electric signal to drive the rotor. When the smart ball rotates in the same direction as the flywheel around the rotary shaft by the rotational movement of the flywheel, the outer surface of the smart ball is rotated while contacting the inner circumferential surface of the pipe. Since the rotational speed of the flywheel is set to be varied by the control unit, the rotational force of the smart ball is increased or decreased, so that the rotational friction force is variably transmitted.

According to another embodiment of the present disclosure, the flywheel is mounted in an eccentric position about the rotary shaft to generate vibratory force due to eccentric rotation.

According to another embodiment of the present disclosure, there is provided a pipeline inspection system including: a pipeline inspection system including: a smart ball formed of a transparent material; a main body provided inside the smart ball; a camera provided in the main body to capture images of the outside through the smart ball; a gyro sensor and a GPS receiver provided on the main body; a control means provided in the main body to receive signals from the camera, the gyro sensor, and the GPS receiver and to control operations of the driving means; and a Bluetooth module for transmitting and receiving various kinds of information.

According to another embodiment of the present disclosure, the smart ball has a diameter smaller than the inner diameter of the pipe so as to be inserted into the pipe, and the control means can wirelessly communicate with a remote controller manipulated by a worker.

According to another embodiment of the present disclosure, the main body comprises a chemical spraying means operated by the control means to spray chemicals for removing scale, and a water leakage blocking means for repairing a water leakage point.

According to another embodiment of the present disclosure, the driving means comprises: a driving wheel provided at the lower side of the main body so that the lower peripheral portion comes into close contact with the inner circumferential surface of the smart ball; and a driving motor connected to the driving wheel.

According to another embodiment of the present disclosure, discharge holes are formed in both sides of the smart ball, and the chemical spraying means and the water leakage blocking means respectively include: reservoirs in which chemicals for removing scale are stored; connection pipes for connecting the reservoirs and the discharge holes to each other; and supply pumps respectively provided at the middle portions of the connection pipes.

According to another embodiment of the present disclosure, the smart ball includes: a support portion formed to have a cylindrical shape extending in a lateral direction and having the main body therein; and a pair of first and second rotating parts formed in a dome shape corresponding to each other and provided on both sides of the support portion, and the main body is fixed at the lower side inside the support portion. The driving unit comprises first and second driving shafts extending to both sides of the main body and respectively connected to the first and second rotating parts, and a pair of driving motors connected to the first and second driving shafts to drive the first and second driving shafts.

According to another embodiment of the present disclosure, the chemical spraying means includes: a first injection hole provided on the circumferential surface of the first rotating part; a first storage container provided in the main body and connected to a first rotary coupler provided on the first driving shaft through a first supply pipe; a first supply pump provided in the first supply pipe; and a second supply pipe connecting the first driving shaft and the first injection hole.

According to another embodiment of the present disclosure, the leakage blocking means includes: a second injection hole provided in the circumferential surface of the second rotating part; a second storage container provided in the main body and connected to a second rotary coupler provided on the second driving shaft through a third supply pipe; and a fourth supply pipe connecting the second driving shaft and the second injection hole.

According to another embodiment of the present disclosure, the support portion is provided with a braking means which is operated under the control of the control means to position the support portion. The braking means includes: a first fixing bar provided on the upper surface of the support portion to be projected to the upper side of the support portion by a first retractable driving means; and second and third fixing bars provided to be spaced apart from each other in the back-and-forth directions on the lower side of the support portion, and projected to the front and rear of the lower circumference of the support portion by the second and third retractable driving means.

Meanwhile, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. In the detailed description, the same reference numbers of the drawings refer to the same or equivalent parts of the present disclosure.

The present disclosure can provide a pipeline inspection system for effectively managing a pipeline by inspecting a state of the pipeline while moving along the pipeline.

Moreover, the present disclosure can provide data on the pipeline state and location when an owner of a building transfers ownership thereof.

Furthermore, the present disclosure can provide a pipeline inspection system, which can improve scale removal efficiency by removing scale accumulated on the inner wall of the pipeline with ultrasonic vibrations and prevent water leakage due to the corrosion of the inner wall of the pipeline.

DETAILED DESCRIPTION

Figure 1:
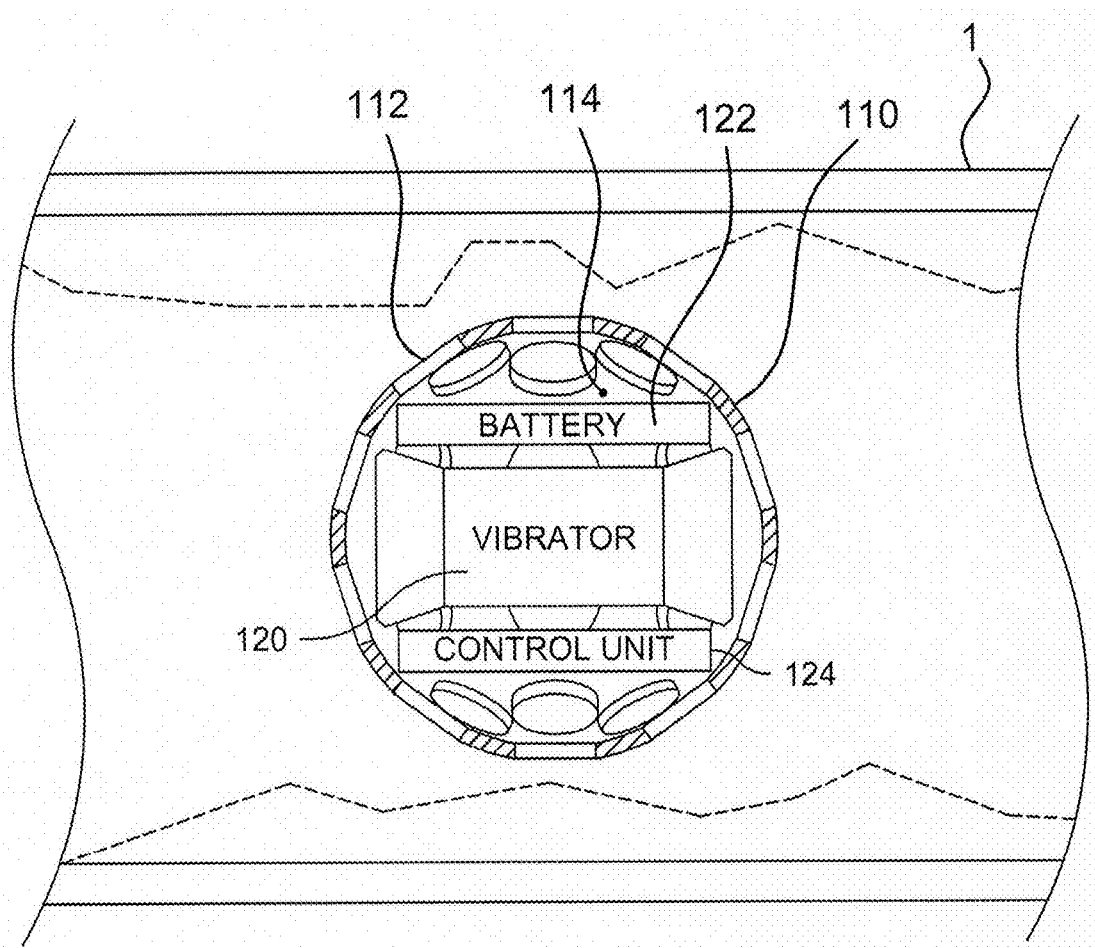
FIG. 1 is a view illustrating an overall configuration of a pipeline inspection system according to a first embodiment of the present disclosure.

Hereinafter, preferred embodiments of the present disclosure will be described in detail with reference to the accompanying drawings. Additionally, In the description of the present disclosure, when it is judged that detailed descriptions of known functions related to the present disclosure may make the essential points vague, the detailed descriptions of the known functions will be omitted.

FIGS. 1 to 8 illustrate a first embodiment of the present disclosure, FIGS. 9 to 13 illustrate a second embodiment of the present disclosure, and FIGS. 14 to 18 illustrate a third embodiment of the present disclosure.

A pipeline inspection system according to the first embodiment of the present disclosure includes a smart ball 110 and an ultrasonic vibration module 120.

The smart ball 110 according to the present disclosure is formed with a spherical shape to move along the inside of a pipe 1, and has a plurality of through-holes 112 penetrating the outer circumferential surface and a space portion 114 formed inside the smart ball to communicate with the through-holes 112.

Figure 2:
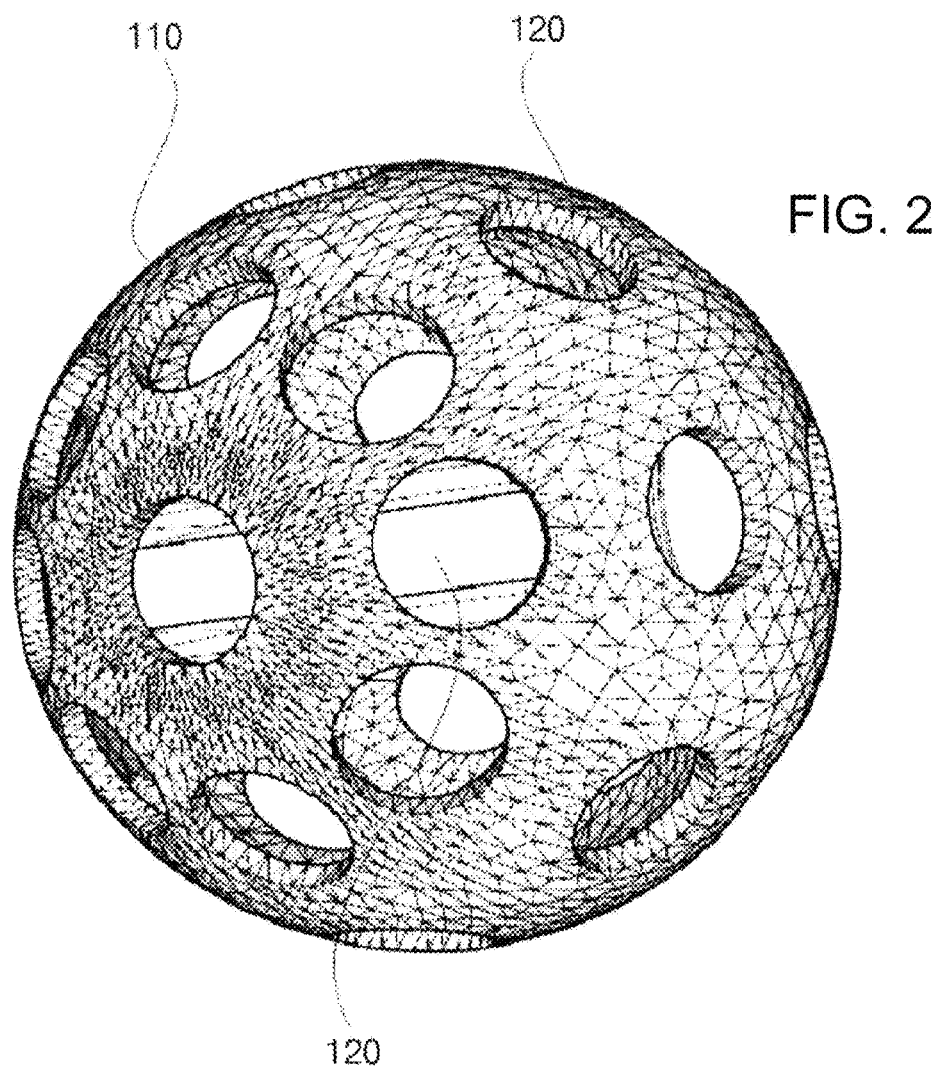
FIG. 2 is a perspective view illustrating the pipeline inspection system according to the first embodiment of the present disclosure.
Figure 3:
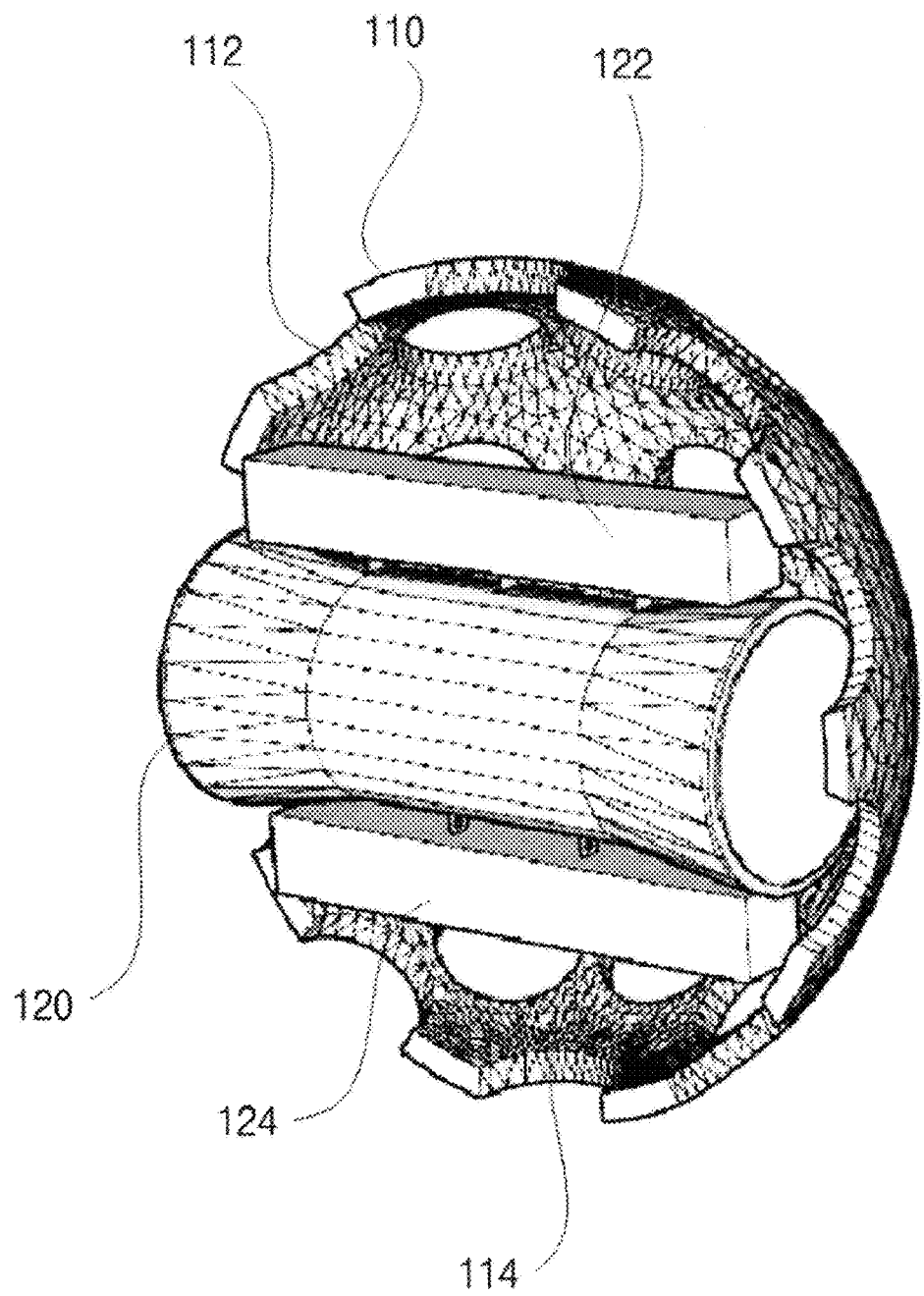
FIG. 3 is a perspective view illustrating an internal structure of the pipeline inspection system according to the first embodiment of the present disclosure.

The smart ball 110 is formed of an empty sphere, and the plurality of through-holes 112 penetrating the outer circumferential surface as illustrated in FIG. 2 communicate with one another via the inner space portion 114 so that fluid inside the pipe 1 can circulate through the smart ball 110.

That is, when the smart ball 110 is inserted into the pipe 1, ultrasonic vibrations are generated by the ultrasonic vibration module 120, which will be described later. while a scale removing process is performed, the fluid is introduced into the through-hole 112 on one side in the pipe 1, and is discharged through the through-hole 112 of the other side via the space portion 114.

Therefore, since the scale removed by the smart ball 110 moves rapidly along the pipe 1, the filtration rate of a filtering module 130, which will be described later, is improved.

Moreover, the ultrasonic vibration module 120 according to the present disclosure is mounted in the space portion 114 of the smart ball 110, is driven by electric power of a battery 122, and is controlled wirelessly by a control unit 124.

The ultrasonic vibration module 120 generates ultrasonic vibrations (40 to 120 kHz) when being turned on by the control unit 124. In this instance, the control unit 124 wirelessly transmits and receives a control signal by means of a short-range communications module, and has a GPS module mounted therein so as to detect a moving position of the smart ball 110 in real time.

In operation, when the smart ball 110 is moved along the pipe 1, and ultrasonic vibrations are generated by the ultrasonic vibration module 120, the ultrasonic vibrations are emitted by the fluid inside the pipe 1 as a carrier, so that the scale is removed by the cavitation phenomenon.

In this instance, because the fluid inside the pipe 1 is a fluid with low dissolved oxygen saturation from which oxygen is removed, ultrasonic vibrations are emitted to maximize the cavitation phenomenon.

Figure 4:
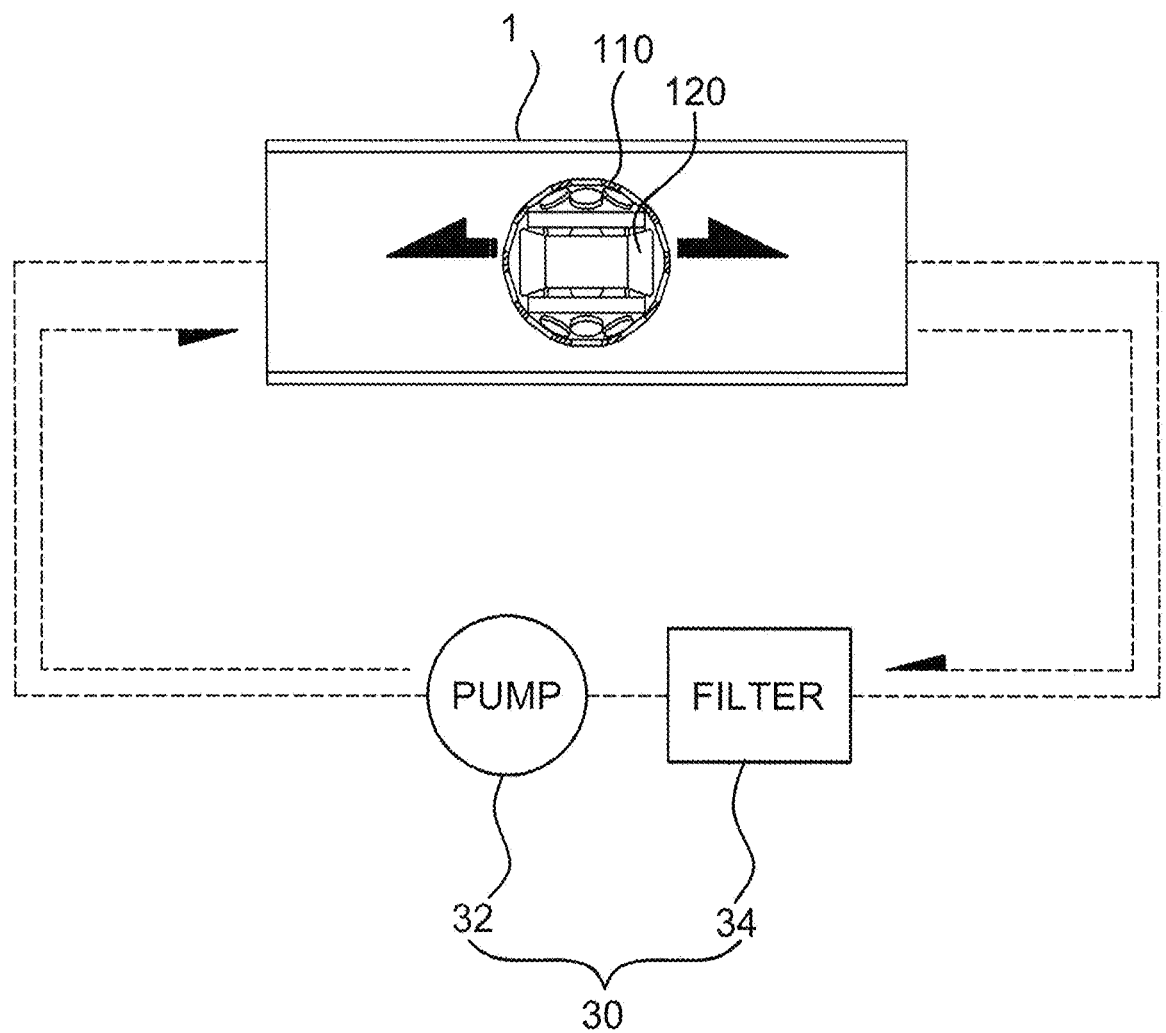
FIGS. 4 and 5 are configuration views of a filtering module of the pipeline inspection system according to the first embodiment of the present disclosure.

In FIG. 4, the fluid inside the pipe 1 is provided to be circulated through a filtering process by the filtering module 130.

The filtering module 130 includes a pump 132 connected to the inlet and the outlet of the pipe 1 to circulate the internal fluid, and a filter 134 mounted on the outlet of the pipe 1 to filter foreign matter containing scale.

Furthermore, the fluid filtered by the filter 134 is circulated and supplied through the inlet of the pipe 1 by the pump 132 and is provided to be circulated and transferred through the through-holes 112 and the space portion 114 of the smart ball 110.

In this instance, the fluid transfer speed is controlled by the output of the pump 132. When the fluid transfer speed is increased, the moving speed of the smart ball 110 is also increased, and when the fluid transfer speed is decelerated, the smart ball 110 is moved at a low speed.

On the other hand, the fluid transfer direction is controlled to be opposed by the pump 132 so that the smart ball 110 is set to reciprocate in the pipe 1, thereby automatically performing the scale removal work using the smart ball 110 for a long time depending on the degree of scale accumulation.

Figure 5:
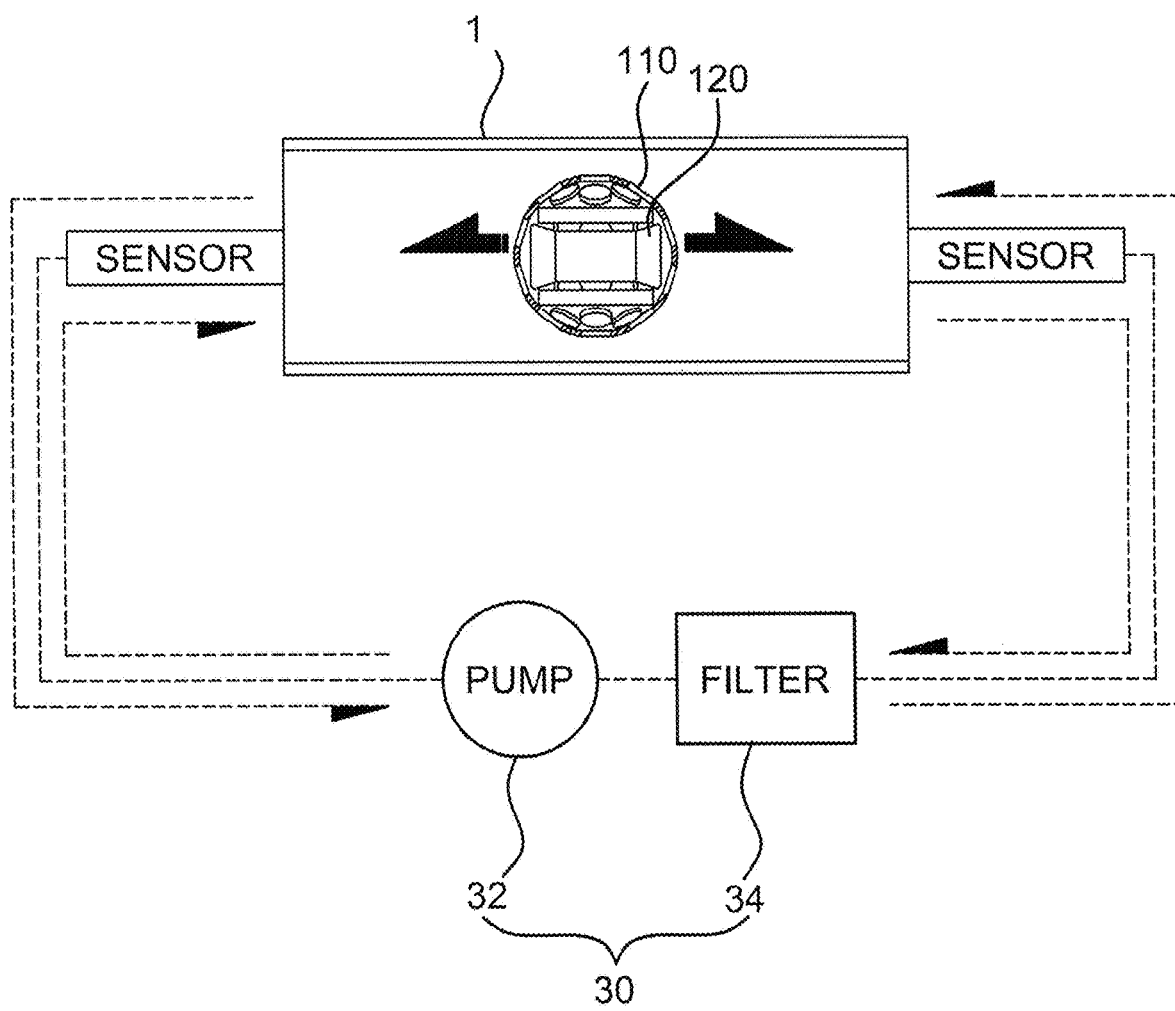

That is, as illustrated in FIG. 5, sensors (S) are provided in positions corresponding to the inlet and the outlet of the pipe 1 to detect whether the smart ball 110 reaches the inlet or the outlet of the pipe 1, and then is set to a control unit to switch the fluid movement direction of the pump 132 automatically in the opposite direction.

Figure 6:
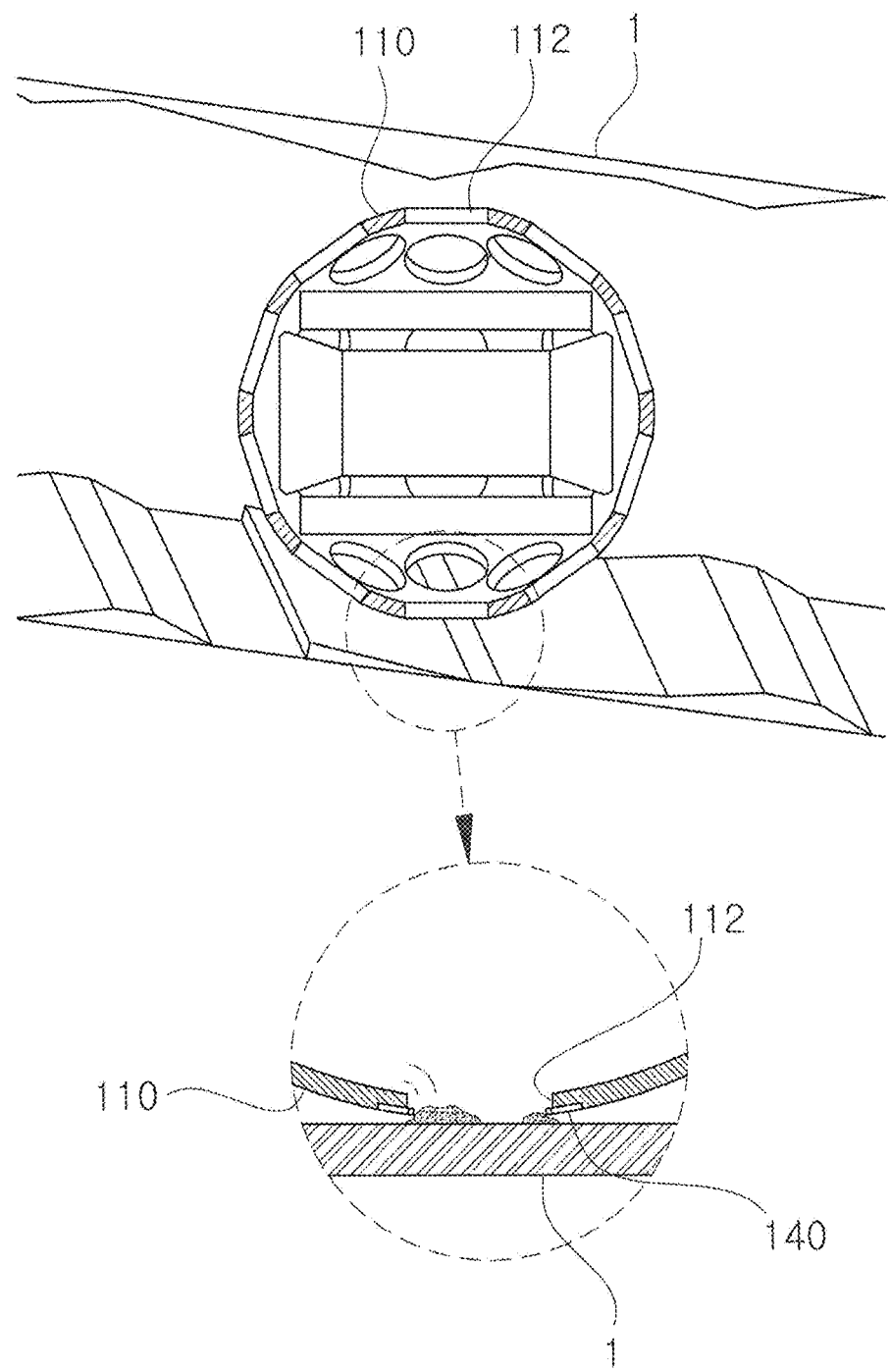
FIG. 6 is a configuration view of a vibrating blade of the pipeline inspection system according to the first embodiment of the present disclosure.

In FIG. 6, the through-holes 112 of the smart ball 110 are inclined holes having a diameter extending inwardly from the exterior, and the outer circumferential surface of the smart ball 110 comes into contact with the outer end of the through-hole 112 at an inclined angle so that a vibration blade 140 of a saw blade structure is formed at a boundary part.

When scale is received into the through-hole 112 while the smart ball 110 is moved in a state of being grounded on the inner circumferential surface of the pipe 1, the vibration blade 140 is vibrated to cut off the scale, thereby improving scale removal efficiency.

Meanwhile, the vibration blade 140 is preferably mounted so that it is replaceable.

Figure 7:
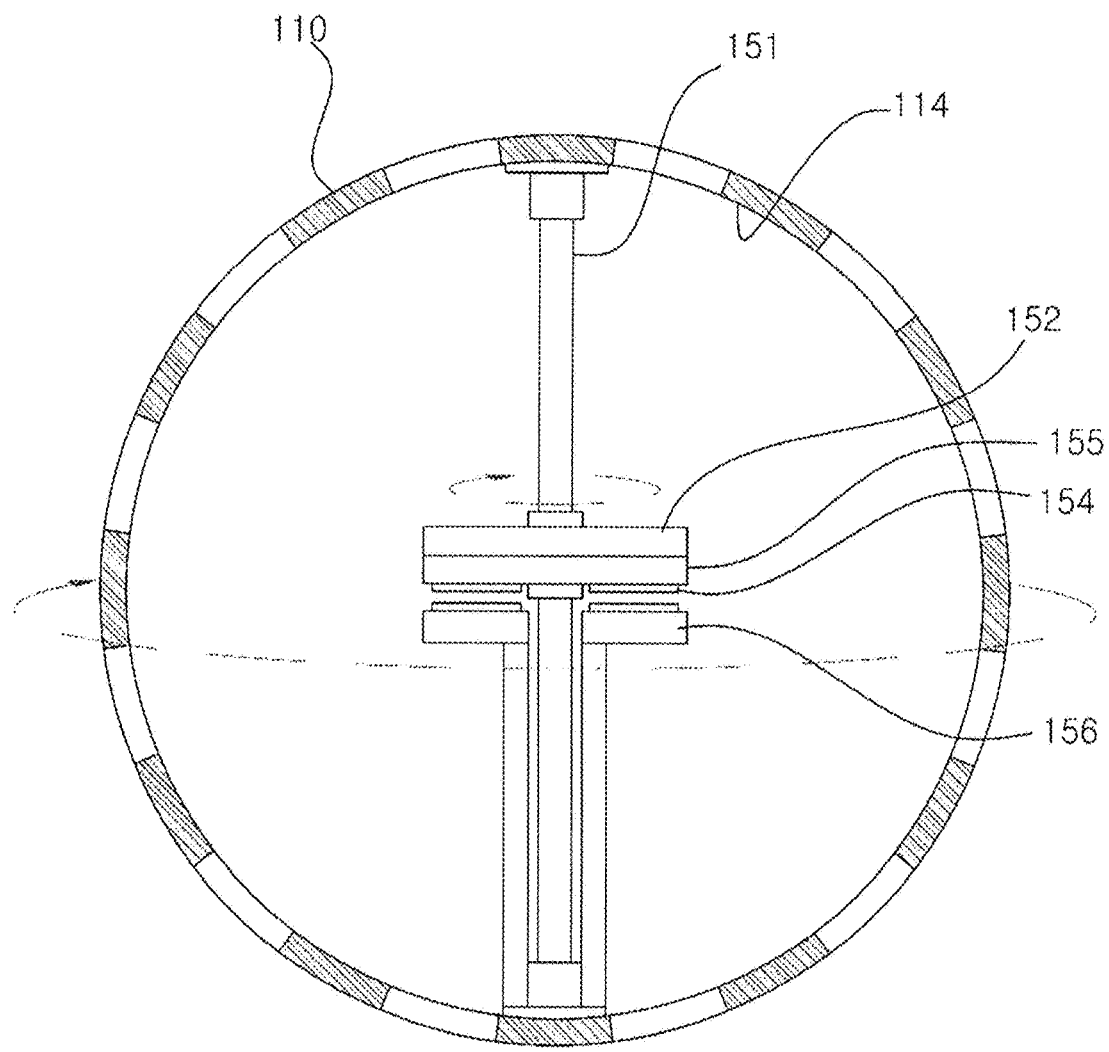
FIGS. 7 and 8 are configuration views of a rotational core module of the pipeline inspection system according to the first embodiment of the present disclosure.

In FIG. 7, a rotational core module 150 is provided in the space 114 of the smart ball 110.

The rotational core module 150 includes: a rotary shaft 151 of which both ends are rotatably mounted on the inner circumferential surface of the space portion 114; a flywheel 152 mounted on the rotary shaft 151; a rotor 155 in which permanent magnets 154 with the north pole and the south pole are alternately and repeatedly arranged around the rotary shaft 151; and a stator 156 fixed in the space portion 114 to correspond to the rotor 155 and controlling the magnetic force by an electric signal to drive the rotor 155.

When the smart ball 110 rotates in the same direction as the flywheel 152 around the rotary shaft 151 by the rotational movement of the flywheel 152, the outer surface of the smart ball 110 is rotated while contacting the inner circumferential surface of the pipe 1, thereby improving the scale removal efficiency by a complex action with the ultrasonic vibrations.

In addition, since the rotational speed of the flywheel 152 is set to be varied by the control unit, the rotational force of the smart ball 110 is increased or decreased, so that the rotational friction force is variably transmitted, thereby easily removing even hard scale by the repetitive rotational friction force.

Figure 8:
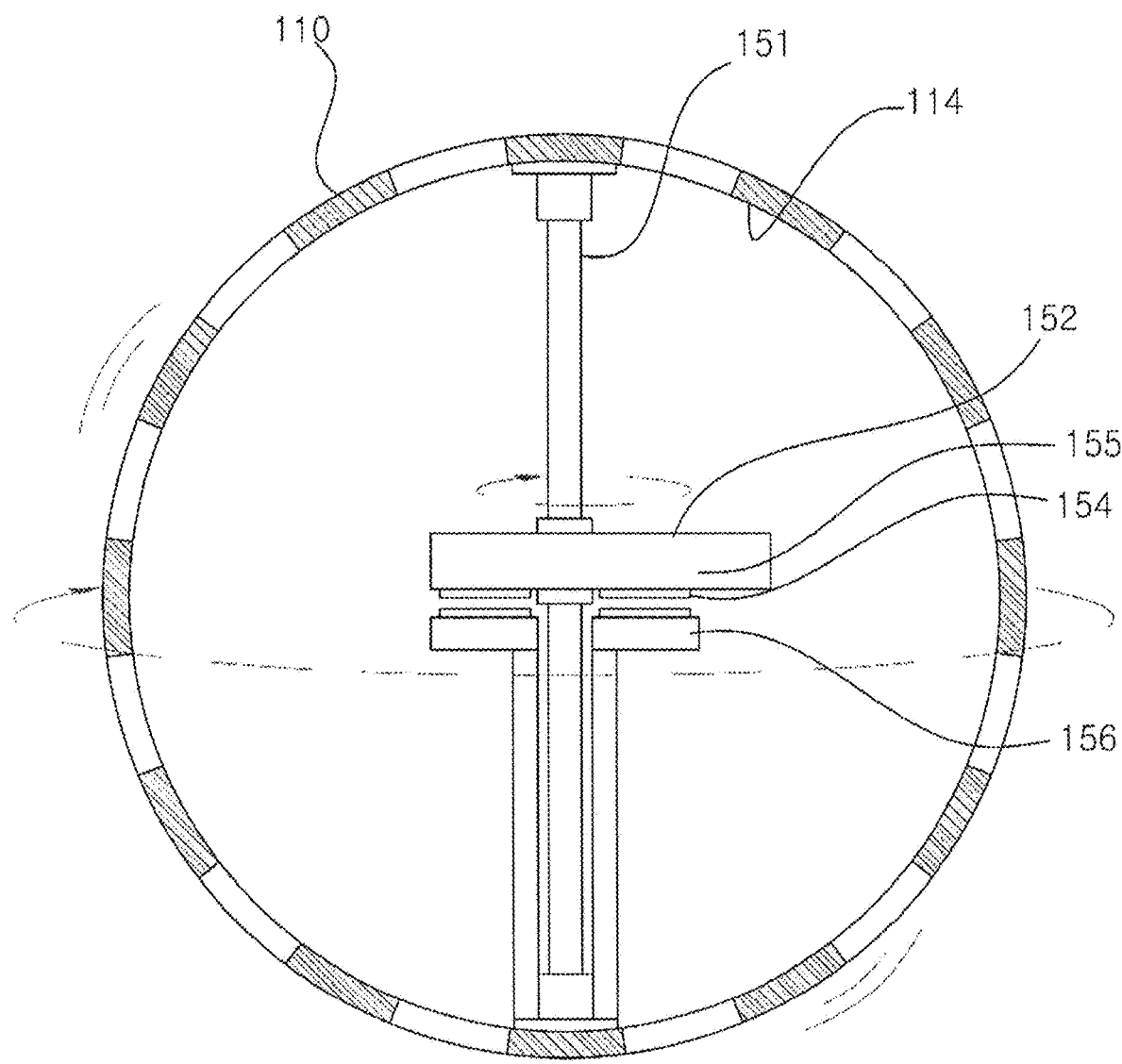
Figure 9:
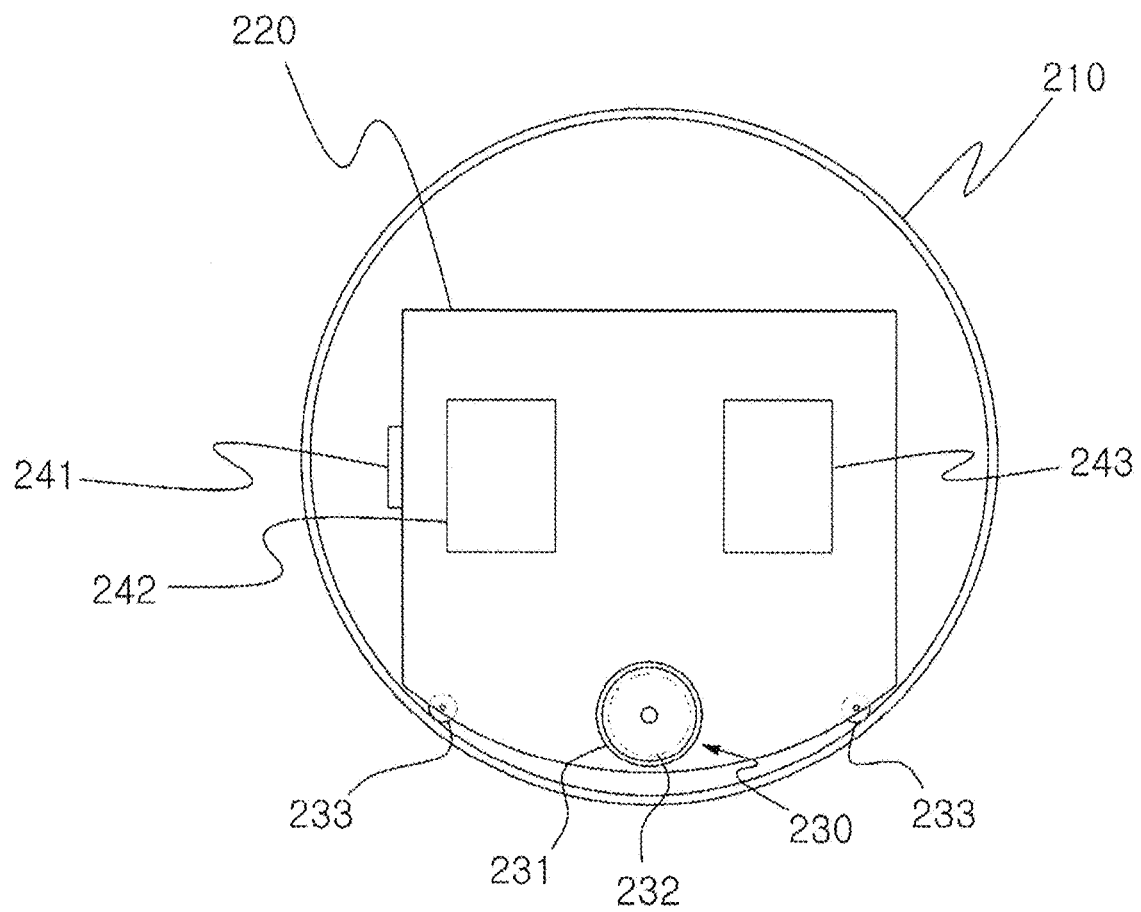
FIG. 9 is a side cross-sectional view illustrating a pipeline inspection system according to a second embodiment of the present disclosure.
Figure 10:
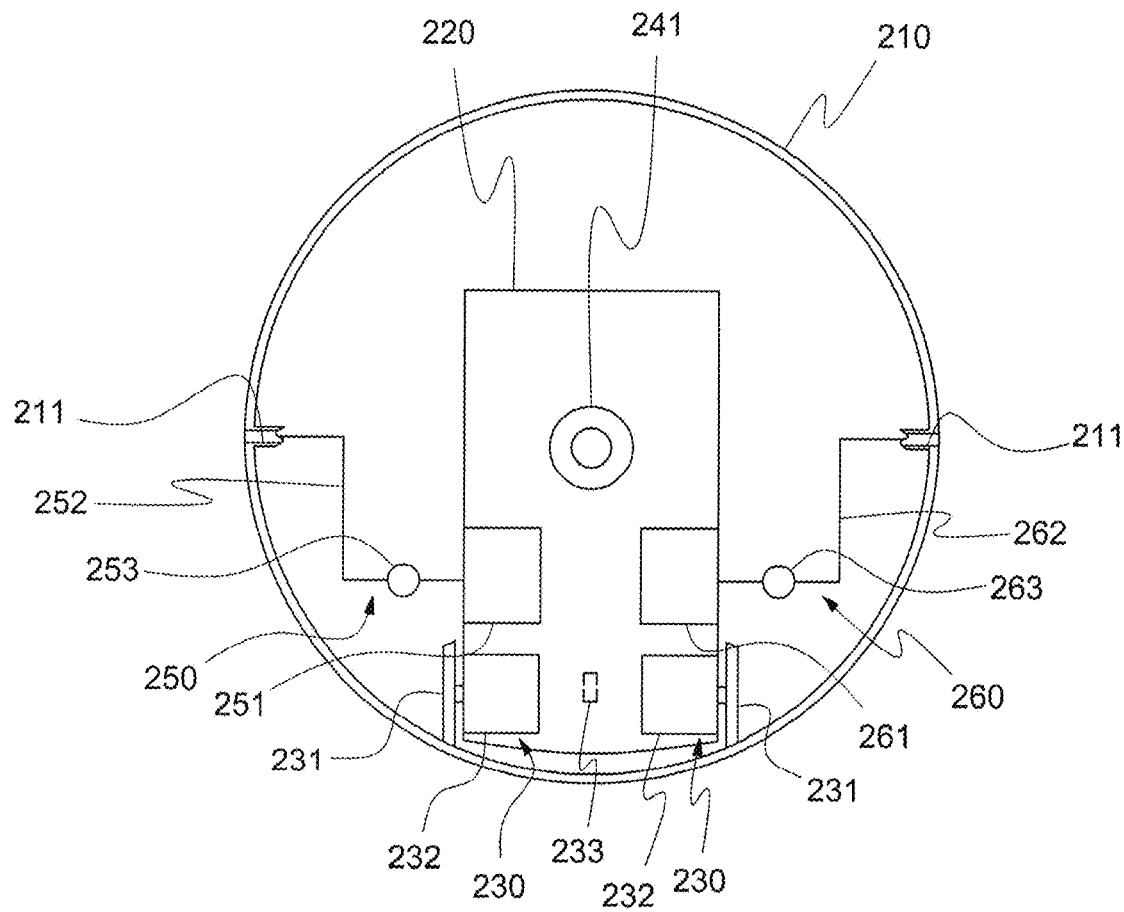
FIG. 10 is a front cross-sectional view illustrating the pipeline inspection system according to the second embodiment of the present disclosure.
Figure 11:
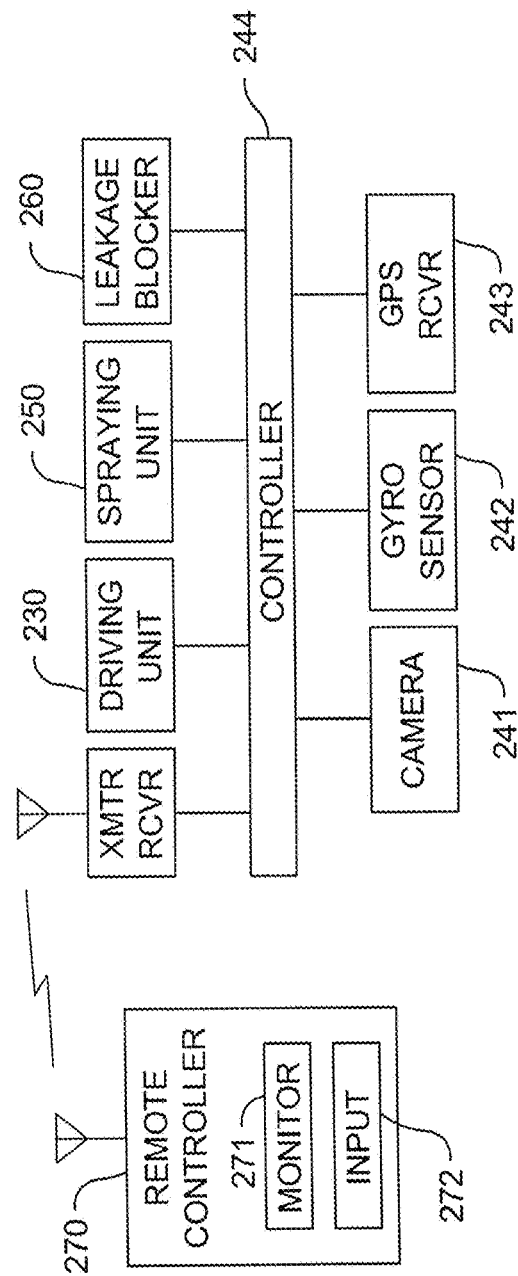
FIG. 11 is a circuit configuration diagram of the pipeline inspection system according to the second embodiment of the present disclosure.

In FIG. 8, the flywheel 152 is mounted in an eccentric position about the rotary shaft 151 to generate vibratory force due to eccentric rotation.

When the smart ball 110 collides repeatedly against the inner circumferential surface of the pipe 1 by the vibration force caused by the eccentric rotation of the flywheel 152, the scale removal impact is applied from multiple angles, thereby improving scale removal efficiency.

The second embodiment of the present disclosure includes a smart ball 210, a main body 220, and a driving unit 230.

As illustrated in FIGS. 9 to 13, the pipeline inspection system according to the present disclosure includes: a smart ball 210 formed of a transparent material; a main body 220 provided inside the smart ball 210; a camera 241 provided in the main body 220 to capture images of the outside through the smart ball 210; a gyro sensor 242 provided on the main body 220; a GPS receiver 243 provided in the main body 220; and a control means 244 provided in the main body 220 to receive signals of the camera 241, the gyro sensor 242, and the GPS receiver 243 and to control operations of the driving means 230.

The smart ball 210 is formed of a transparent synthetic resin material with high strength in a spherical shape, and discharge holes 211 are formed in the middle parts of both sides thereof.

In addition, the outer diameter of the smart ball 210 is smaller than the diameter of the pipe 1. The pipeline inspection system is configured to move along the pipe 1 by water flowing in the pipe 1 when the pipeline inspection system is inserted into the pipe 1.

The main body 220 is close to the lower side inside the smart ball 210, and is configured such that the center of gravity is located at the lower side.

In this instance, the main body 220 includes a chemical spraying means 250 operated by the control means 244 to spray chemicals for removing scale, and a water leakage blocking means 260 for repairing a water leakage point.

The chemical spraying means 250 and the water leakage blocking means 260 respectively include: reservoirs 251 and 261, in which chemicals for removing scale are stored; connection pipes 252 and 262 for connecting the reservoirs 251 and 261 and the discharge holes 211 to each other; and supply pumps 253 and 263 respectively provided at the middle portions of the connection pipes 252 and 262. When the supply pumps 253 and 263 are operated, the chemicals for removing scale or the adhesives for blocking water leakage which are respectively stored in the reservoirs 251 and 261 are discharged through the discharge holes 211, thereby removing the scale stained on the inside of the pipe 1 or blocking holes or cracks formed in the pipe 1.

In this instance, the chemicals for removing scale sprayed from the chemical spraying means 250 or the water leakage blocking adhesives sprayed from the water leakage blocking means 260 has been developed and used in various types, and therefore, a detailed description thereof is omitted.

The camera 241 is provided on the front surface of the main body 220 to capture images of the front and to transmit the images to the control means 244 in real time.

The driving means 230 includes: a driving wheel 231 provided at the lower side of the main body 220 so that the lower peripheral portion comes into close contact with the inner circumferential surface of the smart ball 210; and a driving motor 232 connected to the driving wheel 231.

In this instance, auxiliary wheels 233 are disposed on the front and rear sides of the lower surface of the main body 220 to get in close contact with the inner circumferential surface of the smart ball 210.

Figure 12:
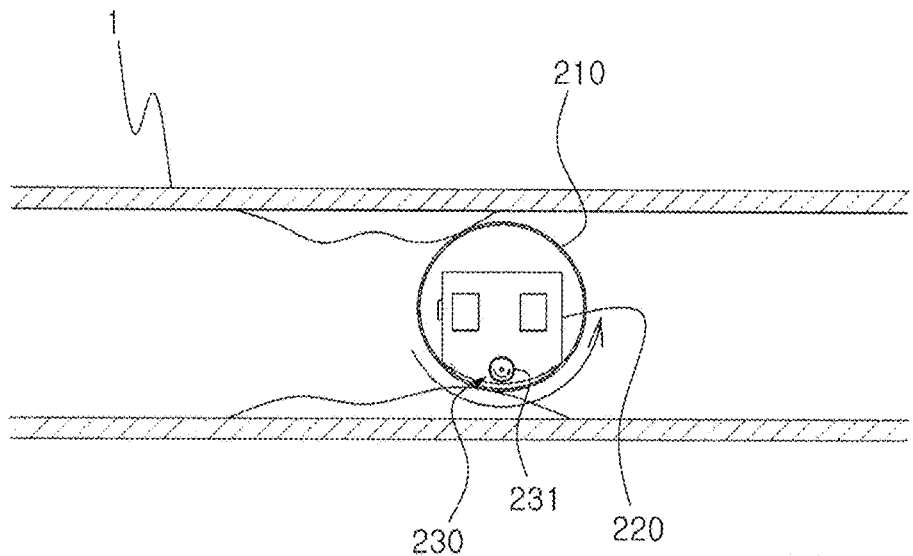
FIGS. 12 and 13 are reference views illustrating operations of the pipeline inspection system according to the second embodiment of the present disclosure.
Figure 13:
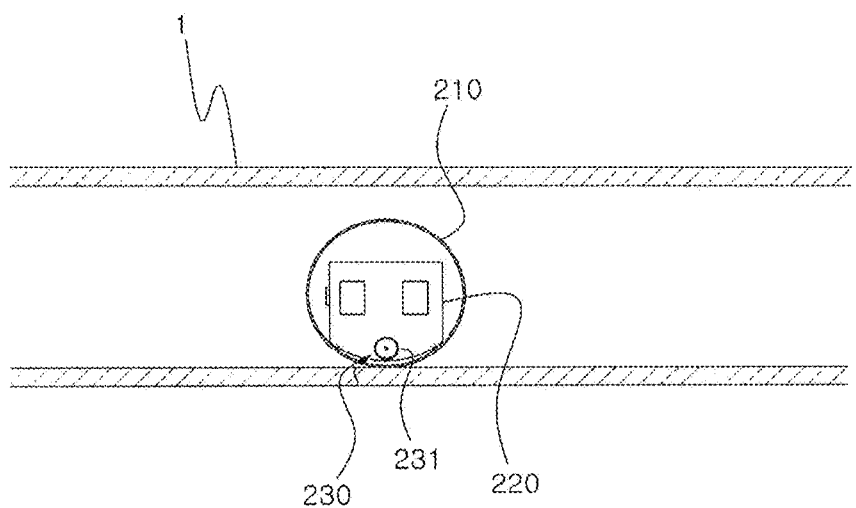

Therefore, as illustrated in FIG. 12, when the driving wheel 231 is driven by the driving motor 232, the smart ball 210 is rotated.

The gyro sensor 242 measures the inclination of the main body 220 and transmits the measured inclination value to the control means 244.

The GPS receiver 243 receives the radio wave outputted from a GPS satellite, measures the position of the main body 220 in real time, and outputs the measured position data to the control means 244.

The control means 244 is configured to communicate wirelessly with a remote controller 270 manipulated by a worker to output image data outputted from the camera 241, a slope value outputted from the gyro sensor 242, and position data outputted from the GPS receiver 243 to the remote controller 270.

The pipeline inspection system according to the present disclosure includes: a smart ball 210 formed of a transparent material; a main body 220 provided inside the smart ball 210; a camera 241 provided in the main body 220 to capture images of the outside through the smart ball 210; a gyro sensor 242 provided on the main body 220; a GPS receiver 243 provided in the main body 220; and a control means 244 provided in the main body 220 to receive signals of the camera 241, the gyro sensor 242, and the GPS receiver 243 and to control operations of the driving means 230. The smart ball 210 has a diameter smaller than the inner diameter of the pipe 1 so as to be inserted into the pipe 1, and the control means 244 can wirelessly communicate with a remote controller 270 manipulated by a worker.

Therefore, when the pipeline inspection system is inserted into the pipe 1, the smart ball is moved along the pipe 1 by the flow of water inside the pipe 1. In this instance, the camera 241 photographs the inside of the pipe 1 and transmits the photographed images to the remote controller 270 so that a worker can check the internal state of the pipe 1 with the naked eye.

Especially, as illustrated in FIG. 12, if the smart ball cannot move forward by being caught to the scale inside the pipe 1, when a worker manipulates the remote controller 270 to drive the driving means 230, the smart ball 210 is rotated to move forward.

Moreover, since the position data received from the GPS receiver 243 is transmitted to the remote controller 270 through the control means 244, building information modeling (BIM) data of a heating pipe equipped in the building can be constructed by using the received position data.

Furthermore, the main body 220 further includes: a chemical spraying means 250 operated by the control means 244 to spray chemicals for removing scale, and a water leakage blocking means 260 for repairing a water leakage point. Discharge holes 211 are formed in the middle parts of both sides of the smart ball. The chemical spraying means 250 and the water leakage blocking means 260 respectively comprise: reservoirs 251 and 261 in which chemicals for removing scale are stored; connection pipes 252 and 262 for connecting the reservoirs 251 and 261 and the discharge holes 211 to each other; and supply pumps 253 and 263 respectively provided at the middle portions of the connection pipes 252 and 262. A worker manipulates the remote controller 270 to control the chemical spraying means 250 and the water leakage blocking means 260, thereby removing the scale stained on the inside of the pipe 1 or blocking fine holes or cracks formed in the pipe 1.

Therefore, the present invention can maintain the pipe 1 more easily.

Additionally, the driving means 230 includes: a driving wheel 231 provided at the lower side of the main body 220 so that the lower peripheral portion comes into close contact with the inner circumferential surface of the smart ball 210; and a driving motor 232 connected to the driving wheel 231. When the driving motor 232 rotates the driving wheel 231, the smart ball 210 is also rotated.

Therefore, the smart ball 210 can be effectively rotated in forward or reverse directions.

In this embodiment, the pipeline inspection system according to the present disclosure can be applied to maintain various kinds of pipes 1 including not only the heating pipe but also a water supply pipe.

FIGS. 14 to 18 illustrate a third embodiment of the present disclosure. The smart ball 210 includes: a support portion 212 formed to have a cylindrical shape extending in a lateral direction and having the main body 220 therein; and a pair of first and second rotating parts 213 and 214 formed in a dome shape corresponding to each other and provided on both sides of the support portion 212.

In this instance, the main body 220 is fixed to a lower side inside the support portion 212 to form the center of gravity at the lower side inside the support portion 212.

Additionally, the driving unit 230 includes first and second driving shafts 234 and 235 extending to both sides of the main body 220 and respectively connected to the first and second rotating parts 213 and 214, and a pair of driving motors 236 connected to the first and second driving shafts 234 and 325 to drive the first and second driving shafts 234 and 325.

Therefore, when the driving motor 236 is selectively driven, the first and second rotating parts 213 and 214 are selectively rotated forward and backward so that the pipeline inspection system can be moved forward and backward or change the direction.

In this instance, the first and second driving shafts 234 and 235 are formed in a tubular shape having a space therein, and extend to both sides of the support portion 212 via a through-hole 212a formed in both sides of the support portion 212, so that an outer end thereof is fixed to the central part of the first and second rotating parts 213 and 214.

The support portion 212 is provided with a braking means 280 which is operated under the control of the control means 244 to position the support portion 212.

The braking means 280 includes: a first fixing bar 281 provided on the upper surface of the support portion 212 to be projected to the upper side of the support portion 212 by a first retractable driving means 281a; and second and third fixing bars 282 and 283 provided to be spaced apart from each other in the back-and-forth directions on the lower side of the support portion 212, and projected to the front and rear of the lower circumference of the support portion 212 by the second and third retractable driving means 282a and 283a.

The first to third retractable driving means 281a, 282a, and 283a are provided on the inner circumferential surface of the support portion 212 to be connected to the first to third fixing bars 281, 282, and 283, and are operated according to the control signal of the control means 244 to allow the first to third fixing bars 281, 282, and 283 to be released to the outside of the support portion 212 so as to serve as a solenoid device.

In addition, the chemical spraying means 250 includes: a first injection hole 254 provided on the circumferential surface of the first rotating part 213; a first storage container 255 provided in the main body 220 and connected to a first rotary coupler 257 provided on the first driving shaft 234 through a first supply pipe 256; a first supply pump 258 provided in the first supply pipe 256; and a second supply pipe 59) connecting the first driving shaft 234 and the first injection hole 254. When the first supply pump 258 is driven, the chemicals for removing scale, which is stored in the first storage container 255, is discharged to the outside through the first injection hole 254.

In addition, the leakage blocking means 260 includes: a second injection hole 264 provided in the circumferential surface of the second rotating part 214; a second storage container 265 provided in the main body 220 and connected to a second rotary coupler 267 provided on the second driving shaft 235 through a third supply pipe 266; and a fourth supply pipe 269 connecting the second driving shaft 235 and the second injection hole 264. When the second supply pump 268 is driven, the leakage blocking adhesives stored in the second storage container 265 are discharged to the outside through the second injection hole 264.

In this instance, the first and second rotary couplers 257 and 267 are closely coupled to the outer circumference of the base end of the first and second driving shafts 234 and 235 in a state of being fixed to both sides of the support portion 212. Even if the first and second driving shafts 234 and 235 are rotated, the chemicals for removing scale or the leakage blocking adhesives can be continuously supplied to the spaces inside the first and second driving shafts 234 and 235

Moreover, the remote controller 270 is configured to control operations of the braking means 280 by manipulation of a worker.

Now, a method for removing scale from the pipe 1 or blocking a hole or a crack by controlling the pipeline inspection system configured as described above will be described as follows.

Figure 17:
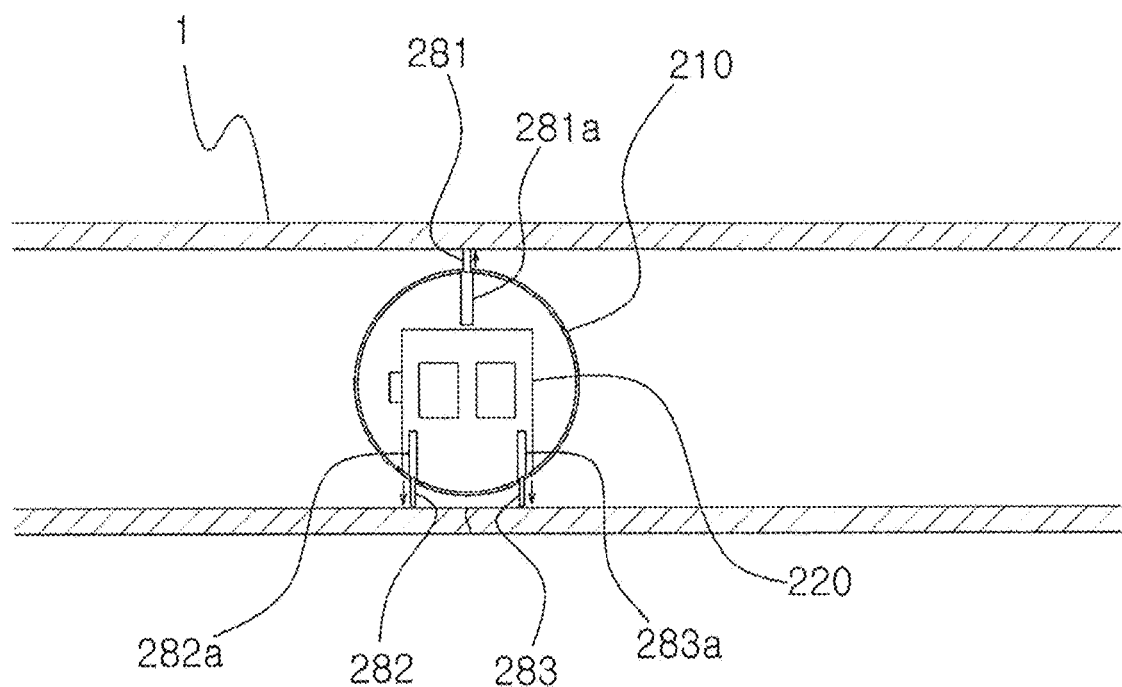
FIGS. 17 and 18 are reference views illustrating operations of the pipeline inspection system according to the third embodiment of the present disclosure.

First, when a worker checks the images captured by the camera 241 through the monitor 271 of the remote controller 270 to check the position where scale is stained or a hole or a crack is formed, controls the driving means 230 to move the smart ball to the position where scale is stained or a hole or a crack is formed, and operates the braking means 280, as illustrated in FIG. 17, the first to third fixing bars 281, 282, and 283 protrude out of the support portion 212 to respectively come into close contact with the inner circumferential surfaces of the upper and lower sides of the pipe 1, so that the support portion 212 is fixed to the central portion of the pipe 1, and at the same time, the first and second rotating parts 213 and 214 are spaced upward from the inner circumferential surface of the pipe 1.

Figure 14:
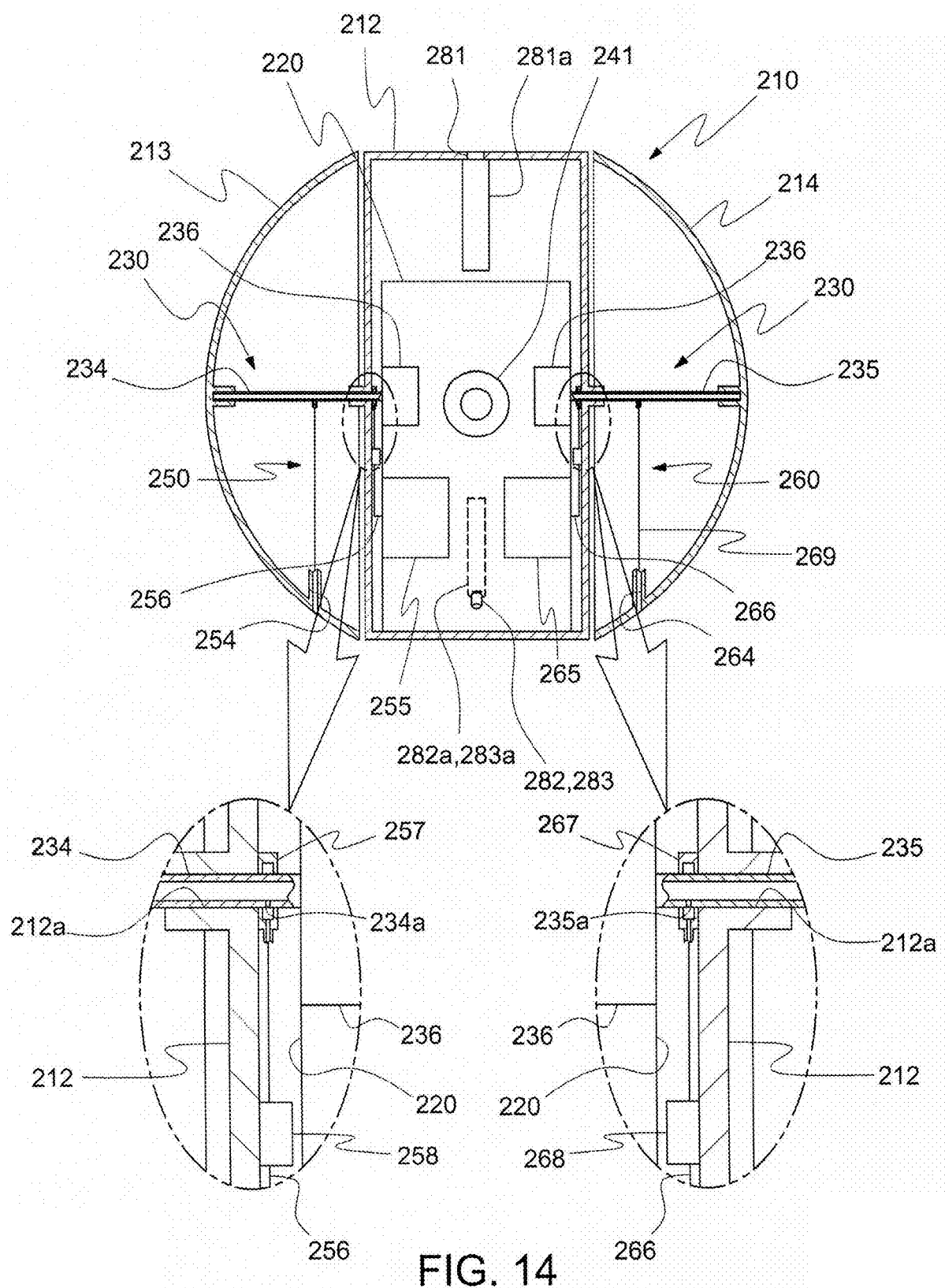
FIG. 14 is a front cross-sectional view illustrating a pipeline inspection system according to a third embodiment of the present disclosure.
Figure 15:
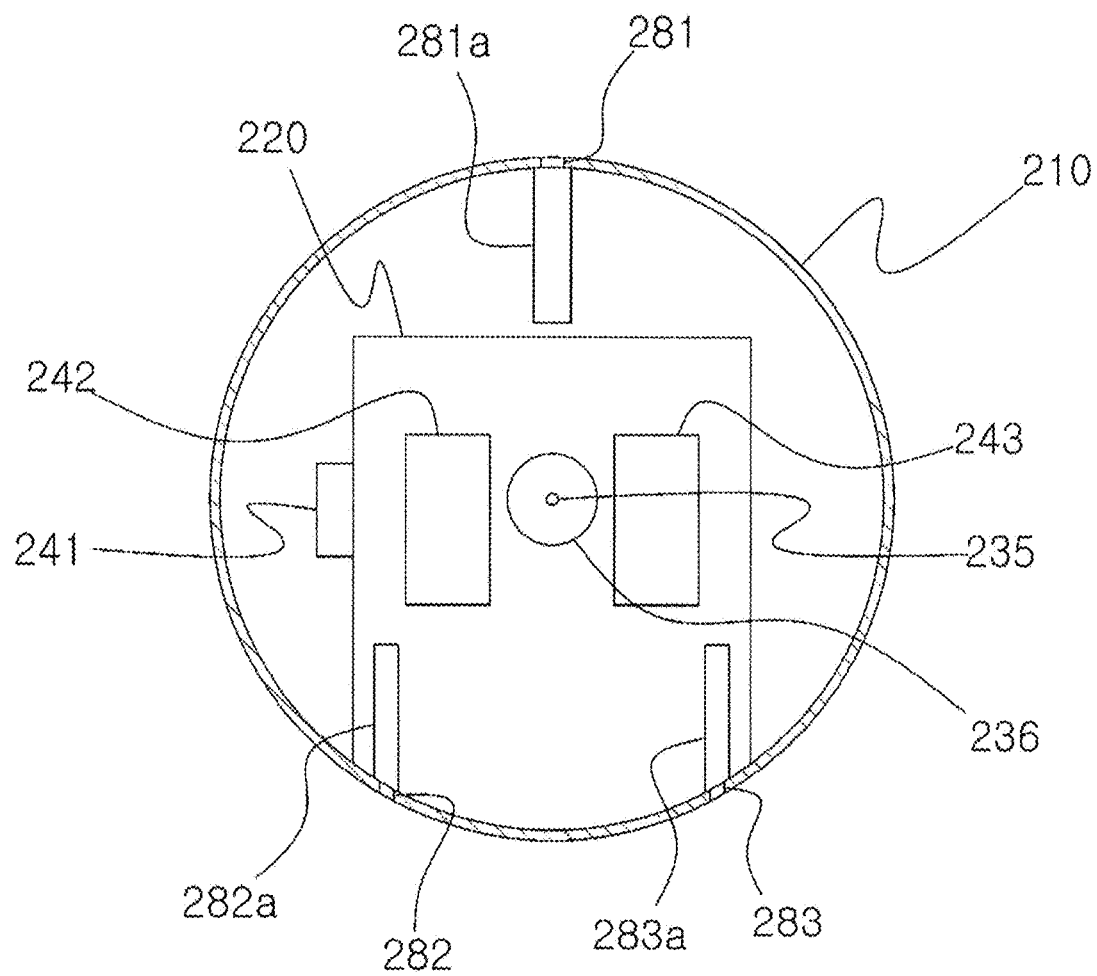
FIG. 15 is a side cross-sectional view illustrating the pipeline inspection system according to the third embodiment of the present disclosure.
Figure 16:
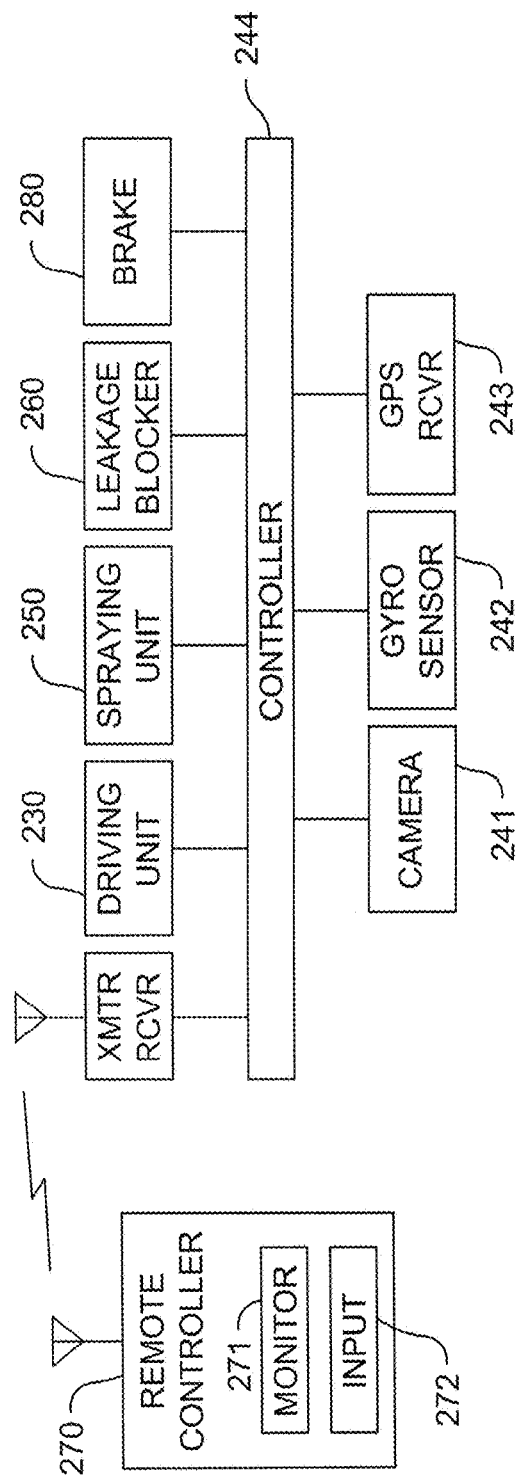
FIG. 16 is a circuit configuration diagram of the pipeline inspection system according to the third embodiment of the present disclosure.
Figure 18:
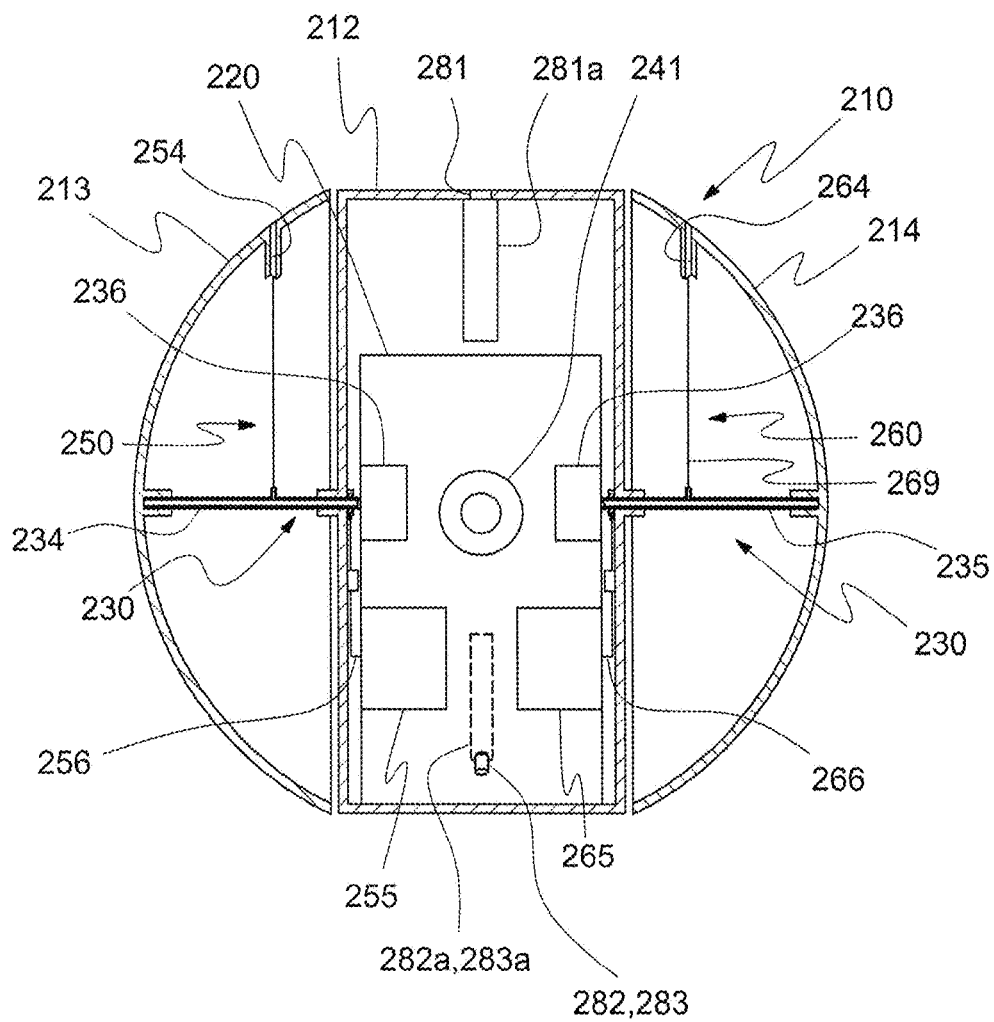

In addition, when a worker controls the input means 272 of the remote controller 270 to control the driving motor 236 of the driving means 230, as illustrated in FIGS. 14 and 18, the first or second rotating parts 213 and 214 are rotated such that the direction of the first or second injection holes 254 or 264 formed in the rotating part can be adjusted into the vertical direction.

That is, the direction of the first or second injection holes 254 or 264 can be adjusted to face scale stained on the inner face of the pipe 1 or a hole or a crack formed in the pipe 1.

Moreover, a worker controls the chemical spraying means 250 or the water leakage blocking means 260 to spray the chemicals for removing scale or water leakage blocking adhesives to the inside of the pipe 1 through the first or second injection holes 254 or 264, thereby removing scale stained on the inner face of the pipe 1 or a hole or a crack formed in the pipe 1.

Therefore, the present invention can more effectively control the position or direction of the smart ball, and more effectively perform work to remove scale stained on the inner face of the pipe 1 or to block a hole or a crack formed in the pipe 1.

While the present invention has been described with reference to particular details such as specific elements, the embodiments, and the drawings as described above, this is provided only to help the overall understanding of the present disclosure and the present disclosure is not limited to the embodiments. It will be understood by those skilled in the art to which the present disclosure belongs that various modifications and changes may be made from the description. Therefore, the spirit of the present disclosure is not determined by being limited to the above-described embodiments, but the claims described later and all of those that are equivalent to the claims and equivalent modifications thereof belong to the spirit and scope of the present disclosure.

Since the descriptions of the disclosed technology are merely embodiments for structural and functional descriptions, the technical scope of the present disclosure should not be construed as limited by the embodiments described herein. In other words, it is to be understood that the technical scope of the present disclosure includes equivalents for implementing the technical idea since the embodiments of the present disclosure may be varied and changed in various manners. In addition, it does not mean that the specific embodiments have to include all of the purposes or effects presented in the present disclosure or include only the purposes or effects presented in the present disclosure, and therefore should not be construed as limiting the technical scope of the present disclosure thereto.

The meanings of the terms used in the present application are to be understood as follows. The terms "first", "second", and the like are intended to distinguish one component from other components, and the scope of the invention should not be limited by these terms. For example, a first component may be named a second component, and similarly a second component may also be named a first component.

It will be understood that when an element is referred to as being "connected" or "coupled" to another element, it can be directly connected to the other element or intervening elements may be present. In contrast, when an element is referred to as being "directly connected" to another element, there are no intervening elements present. Meanwhile, it will be also understood that other expressions to describe relationship between the components, namely, "between", "adjacent to" or "directly neighboring", must be interpreted in the same manner.

It will be understood that the singular forms are intended to include the plural forms as well, unless the context clearly indicates otherwise. It will be further understood that the terms "comprises" and/or "comprising," or "includes" and/or "including" are to specify the presence of stated features, regions, integers, steps, operations, elements, and/or components, but do not preclude the presence or addition of one or more other features, regions, integers, steps, operations, elements, components, and/or groups thereof.

What is claimed is:

1. A pipeline inspection system comprising:
a smart ball having a spherical shape for movement along the inside of a pipe having an inlet and an outlet, the smart ball having a plurality of through-holes penetrating the outer circumferential surface of the smart ball, and an internal space inside the smart ball in communication with the through-holes;

an ultrasonic vibration module mounted in said internal space;

a battery in said internal space, connected to, and providing driving power to, said ultrasonic vibration module; and a control unit, also within said internal space, for controlling operation of said ultrasonic vibration module, said control unit being capable of being operated by wireless signals received from an external source;

wherein, when ultrasonic vibrations are generated by the ultrasonic vibration module while the smart ball is moved along the pipe, the ultrasonic vibrations are transmitted by fluid inside the pipe as a carrier, so that scale is removed from the interior of the pipe by a cavitation phenomenon;

the pipeline inspection system further including a filtering module comprising a pump connected to the inlet and the outlet of the pipe for circulating said fluid, and a filter mounted at the outlet of the pipe for filtering foreign matter containing scale, whereby fluid being filtered by the filter is supplied through the inlet of the pipe by the pump and transferred into and out of said internal space of the smart ball through the through-holes;

wherein the through-holes of the smart ball are inclined holes having a diameter increasing inwardly from the exterior, and the outer circumferential surface of the smart ball meets the outer end of each said through-hole at an inclined angle so that a vibration blade structure is formed at the external boundary of each said through-hole, whereby, when scale is received into a through-hole while the smart ball is moved into contact with the inner circumferential surface of the pipe, the vibration blade structure is vibrated to cut off the scale.

2. A pipeline inspection system comprising:

a smart ball having a spherical shape for movement along the inside of a pipe having an inlet and an outlet, the smart ball having a plurality of through-holes penetrating the outer circumferential surface of the smart ball, and an internal space inside the smart ball in communication with the through-holes;

an ultrasonic vibration module mounted in said internal space;

a battery in said internal space, connected to, and providing driving power to, said vibration module;

a control unit, also within said internal space, for controlling operation of said ultrasonic vibration module, said control unit being capable of being operated by wireless signals received from an external source; and fluid inside the pipe having a low dissolved oxygen saturation resulting from removal of oxygen, wherein, when ultrasonic vibrations are generated by the ultrasonic vibration module while the smart ball is moved along the pipe, the ultrasonic vibrations are transmitted by said fluid inside the pipe as a carrier, so that scale is removed from the interior of the pipe by a cavitation phenomenon;

the pipeline inspection system further comprising a filtering module comprising a pump connected to the inlet and the outlet of the pipe for circulating said fluid, and a filter mounted at the outlet of the pipe for filtering foreign matter containing scale, whereby fluid being filtered by the filter is supplied through the inlet of the pipe by the pump and transferred into and out of said internal space of the smart ball through the through-holes;

wherein the through-holes of the smart ball are inclined holes having a diameter increasing inwardly from the exterior, and the outer circumferential surface of the smart ball meets the outer end of each said through-hole at an inclined angle so that a vibration blade structure is formed at the external boundary of each said through-hole, whereby, when scale is received into a through-hole while the smart ball is moved into contact with the inner circumferential surface of the pipe, the vibration blade structure is vibrated to cut off the scale.

\* \* \* \* \*